ELECTRICAL WAVE PRODUCING CIRCUIT

Original Filed July 21, 1945 4 Sheets-Sheet 1

INVENTOR
L. Y. LACY
BY
Robert J. Fluskey
ATTORNEY

Dec. 9, 1952 L. Y. LACY 2,621,295

ELECTRICAL WAVE PRODUCING CIRCUIT

Original Filed July 21, 1945 4 Sheets-Sheet 2

INVENTOR
L. Y. LACY

BY Robert J. Fluskey
ATTORNEY

Dec. 9, 1952 L. Y. LACY 2,621,295

ELECTRICAL WAVE PRODUCING CIRCUIT

Original Filed July 21, 1945 4 Sheets-Sheet 3

INVENTOR
L. Y. LACY
BY
Robert J. Fluskey
ATTORNEY

Dec. 9, 1952 L. Y. LACY 2,621,295

ELECTRICAL WAVE PRODUCING CIRCUIT

Original Filed July 21, 1945 4 Sheets-Sheet 4

INVENTOR
L. Y. LACY
BY
Robert J. Pluskey
ATTORNEY

UNITED STATES PATENT OFFICE 2,621,295

ELECTRICAL WAVE PRODUCING CIRCUIT

Lester Y. Lacy, Madison, N. J., assignor to Bell Telephone Laboratories, Incorporated, New York, N. Y., a corporation of New York Original application July 21, 1945, Serial No. 606,411. Divided and this application February 15, 1949, Serial No. 76,540

12 Claims. (Cl. 250—36)

This is a division of application Serial No. 606,411, filed July 21, 1945, now Patent No. 2,438,297, for Electrical Wave Producing Circuit.

The present invention relates to the production of waves of angular or pyramidal form for any desired purpose such as sweep waves for electrical scanning purposes or for electrical testing, oscilloscope driving or other purposes.

An object of the invention is to provide method and means which may be used to produce angular waves of accurate shape and which are not limited to producing such waves at particular frequency ranges but can be used to produce such waves at radio frequencies and also at frequencies down to the order of a few cycles per second or lower.

A further object is to provide for the production of angular waves with flexibility as to frequency.

A further object is to produce angular waves by addition of a plurality of square waves and a triangular or saw-tooth wave.

Further and more specific objects will appear as the description proceeds.

In the specific form of the invention disclosed herein, a series of square waves of different frequency and amplitude are simultaneously derived from the same initial source, which may be a vacuum tube oscillator. These square waves are the component waves out of which the final angular wave is constructed. Their dimensions are so chosen that when directly added together, they form a resultant wave of staircase shape. At the same time from the same oscillator a triangular or saw-tooth component wave is caused to be produced having the proper frequency, amplitude and shape to change the staircase wave, when combined therewith, into a uniformly sloped wave. In other words, the individual steps are removed from the wave but the staircase slope is retained. In order to give the final wave both descending and ascending portions, the phase of each of the component waves including the saw-tooth wave is turned over at times at which points of flexure are to occur in the final wave. This results in reversing the slope of the angular wave from rising to falling or from falling to rising.

The various features as well as the nature and objects of the invention will appear more fully from the following detailed description and from the accompanying drawings in which.

Figure 3:
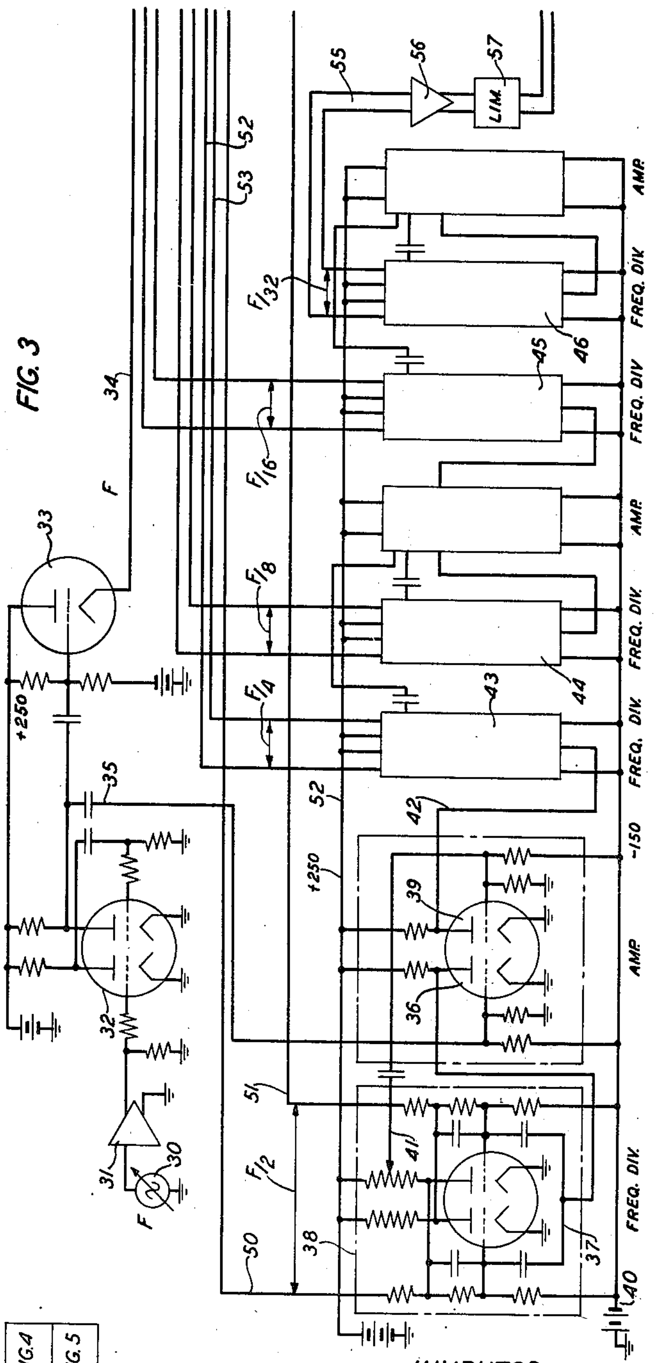
Figure 6:
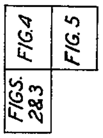
Figure 4:
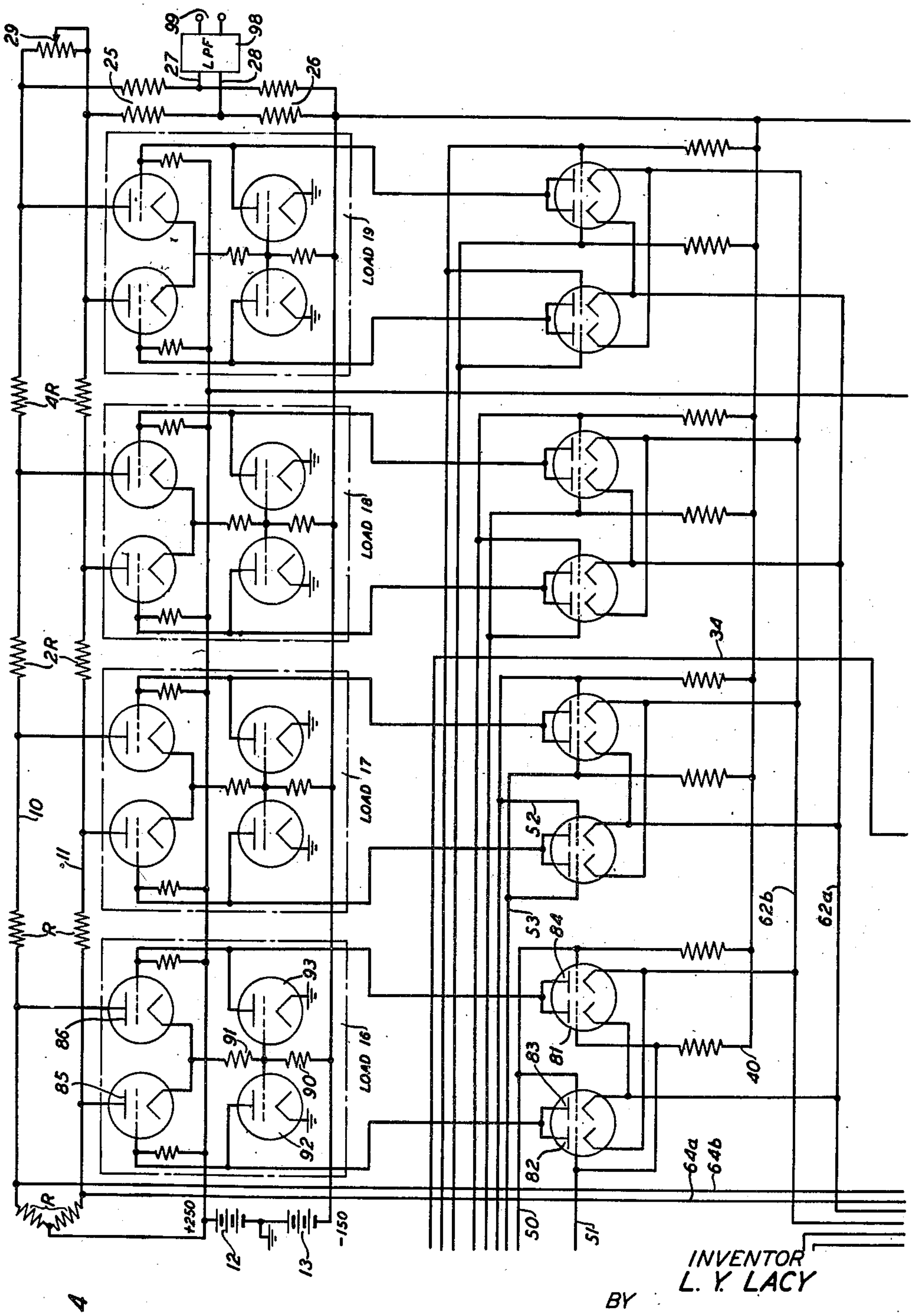
Figure 5:
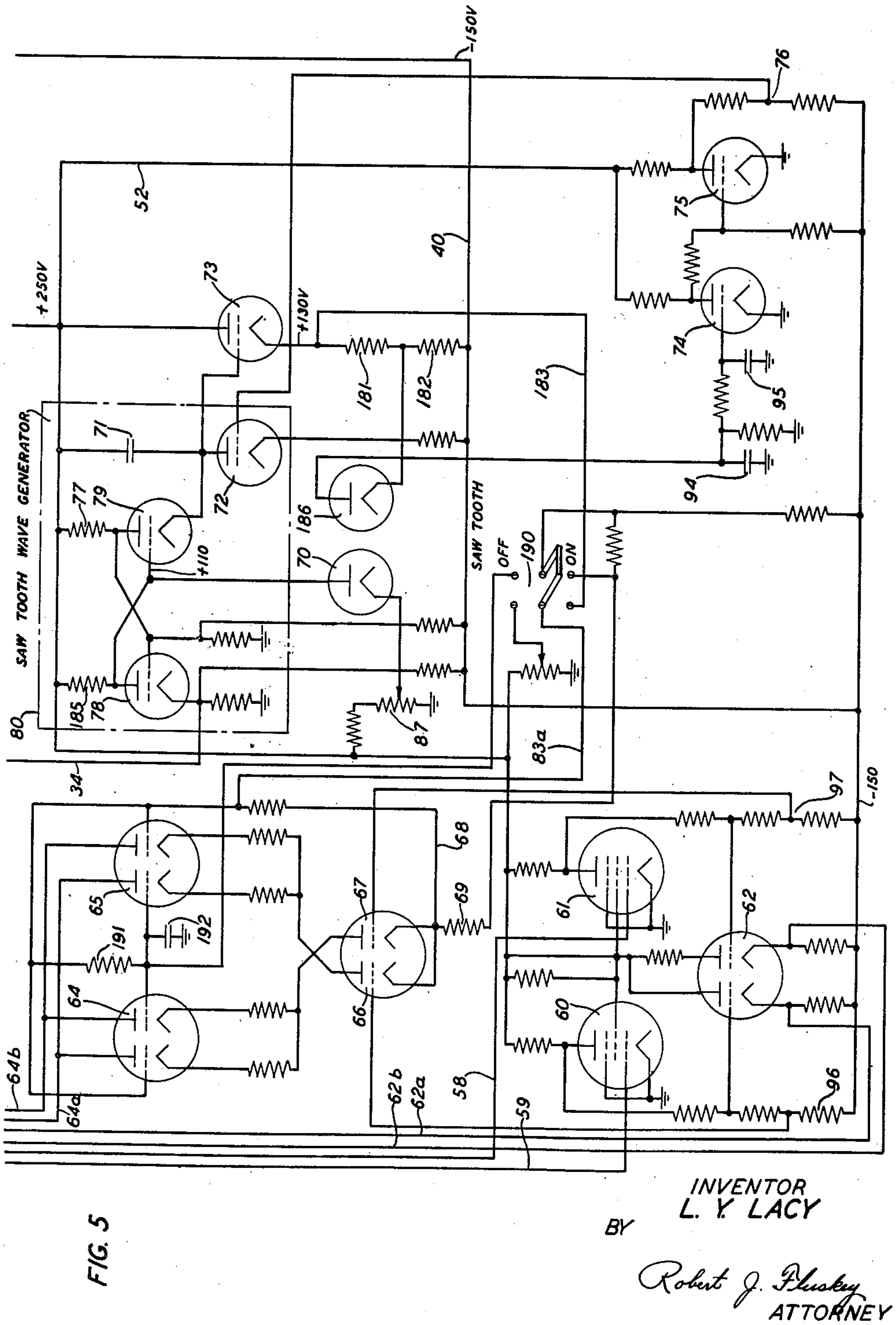

Figs. 3, 4 and 5 when put together as indicated by the key Fig. 6 show the circuit diagram of the entire system in schematic form.

The method of generating the angular or pyramidal sweep wave in accordance with the invention will be explained with the aid of the diagrams on Fig. 1. At the top of this figure are drawn four rectangular waves representing voltages varying in time according to distance measured in the horizontal direction and varying in magnitude according to distance measured in the vertical direction. The upper wave 1 has the highest frequency, each wave 2, 3 and 4 having half the frequency of the wave next above it in the figure and having twice the magnitude of the wave next above it. The summation of these waves by direct algebraic addition gives the staircase wave shown dotted at 5. In order to convert this stepped wave 5 to a smoothly varying triangular or pyramidal wave 6, there is added to wave 5 a saw-tooth wave 7 which has the proper frequency and magnitude to, as it were, tilt the horizontal portions of the staircase wave upward so that they are aligned into a straight line 6.

In order to cause the wave 6 to change its slope at points $T_7$ and $T_8$ so as to be of angular shape, a phase reversal is introduced into each of the waves 1, 2, 3, 4 and 7 at times $T_7$ and $T_8$. If each of these component waves is symmetrical in magnitude with respect to ground (or other reference point), as indicated by the indices at $g$ at the left margin of the figure, the resultant wave 6 is also symmetrical about ground potential indicated by the broken horizontal line $g$.

This method of building up the final wave can result in a high degree of accuracy and stability in the produced wave since each of the component waves can be made highly accurate and stable and the synthesis of the final wave from its components involves a simple addition in a series circuit of voltages that, except for the saw-tooth wave, have only one of two values both of which are definitely determined.

Before describing illustrative circuits for practicing this method of producing an angular wave, the simplified circuit diagram of Fig. 2 will first be explained. This circuit diagram illustrates in elemental form a circuit for carrying out the method described in connection with Fig. 1. The final voltage E is the desired wave of pyramidal form shown at 6 in Fig. 1. This voltage is produced by variations in the current flowing through resistance paths 10 and 11 from the positive pole of grounded battery 12 to the negative pole of grounded battery 13. The current flowing in these resistance paths is varied by varying the manner of connection to the paths 10 and 11 of four load circuits 16, 17, 18 and 19 and by use of a saw-tooth generator 20, connected across the paths 10 and 11. Switches 21, 22, 23 and 24 are indicated for shifting the connection of the respective load circuits from one to the other path 10 or 11. These switches are operated at regularly timed intervals with the same frequency as is assumed for the wave forms 1, 2, 3 and 4 of Fig. 1. Switch 21 is operated at the highest rate, for example, 16 times in a given unit of time. Switch 22 operates half as rapidly or 8 times in the given time interval while switches 23 and 24 operate at rates of respectively 4 and 2 times in the given interval. All of these switches are shown in their lower position. Considering only the upper path 10, with the switches in this position no current is being drawn through any of the resistors in path 10 by any of the loads. Resistor 25 (also 26) will generally have a resistance value many times higher than 8R. The potential at point $P_1$ is therefore high under the conditions assumed and lead 27 is at its highest potential, corresponding to the conditions at time $T_1$ in Fig. 1. At this time each of the waves 1, 2, 3, 4 and 7, and therefore 6, has its maximum positive value.

While the circuit could be operated with only one of the two paths 10 or 11, for example with only the one path 10, in which case the final output wave E would be the voltage between lead 27 and ground, the use of both paths 10 and 11 together with the provision for making complementary changes in the two paths results in the production of wave E across leads 27 and 28 that can be made symmetrical with respect to ground. With the switches all in the positions shown, therefore, the point $P_2$ has its lowest voltage since all of the loads are drawing current through all of the potential dropping resistors in the path 11. These loads are constant current loads to be described in detail later on. It will be noted that the resistors have values of R, R, 2R and 4R progressively toward the right. Neglecting for the present the effect of the saw-tooth source 20, when switch 21 breaks its lower contact and makes its upper contact, the potential at $P_2$ is raised by a definite amount and the potential at $P_1$ is reduced by a like amount. The voltage E is reduced, therefore, by the sum of these two amounts, symmetrically with respect to ground. This occurs at time $T_2$ on Fig. 1. At time $T_3$, switch 21 breaks its upper contact and makes its lower contact. Also switch 22 shifts from lower to upper contact. The former by itself would increase E by one step and the latter by itself would reduce E by two steps, the resultant change in E being a decrease of one step. At time $T_4$ switch 21 again operates to reduce E one step. This process continues, with the three switches 21, 22 and 23 all operating at time $T_5$ and with all four of the switches operating at time $T_6$.

The manner in which the saw-tooth wave is produced and added to the square waves can best be explained in connection with the more specific circuit figures to be described, but it is clear from Fig. 1 that the saw-tooth generator introduces a voltage increment at times $T_1$, $T_2$, $T_3$, etc. and that this increment is decreased at a linear rate to zero in the intervening times.

The manner in which the phase is reversed at the peaks of the wave 6 will be explained in connection with the description of the detailed circuit figures to follow.

The range of voltage variation of the final wave 6 can be varied by changing the value of the shunting resistance 29 without upsetting the symmetry of the wave to ground. The points of connection of leads 27 and 28 to the resistors 25 and 26 can also be varied to control the output voltage E and to maintain symmetry with respect to ground.

Referring now to the detailed circuit shown on Figs. 3, 4 and 5 and at first to the frequency divider circuit of Fig. 3, the timing of the entire circuit is determined by the oscillator 30, which may be any suitable type of alternating-current source such as a vacuum tube oscillator whose frequency can be varied if the system is to be made flexible as to length of the final pyramidal wave. There is no limitation on the frequency F which this generator may produce since all of the circuits controlled by it are electronic. The output wave from 30 may be amplified at 31 and impressed on a square wave circuit consisting of the limiting tube 32 of two stages with high series resistances in its grid circuits for flattening the tops of both half waves. Two pulse outputs are derived from the second stage plate, one leading through a cathode follower amplifier tube 33 via lead 34 to the sweep circuit of Fig. 5 and the other leading via conductor 35 to the grid of amplifier 36 the output of which is connected at 37 to the two control grids of the first divider circuit 38. The grid of amplifier 36 (and 39) is biased beyond cut-off from negative battery bus 40 so that negative pulses received over lead 35 have no effect but positive pulses send amplified negative pulses over 37 to the grids of divider circuit 38. This is a well-known type of flip-flop circuit having two stable conditions in which one or the other half is transmitting saturation current and the opposite half is cut off. The negative pulses received over 37 finds the left half conducting and sends it to cut-off, which causes saturation current to flow in the right half in accordance with the well-known flip-flop action. This produces a negative pulse in output lead 41 but this has no effect since tube 39 is already cut off. The next negative pulse received over 37 flips the circuit 38 in the opposite direction causing the right half to be changed from a current transmitting to a cut-off condition. This sends a positive pulse to the grid of amplifier 39 which then sends a negative pulse over lead 42 to the next divider circuit 43. Thus, every other cycle of the F wave produces a pulse in conductor 42, no pulses being repeated in the intervening cycles. The pulses in conductor 42 occur therefore at half the frequency of the oscillator wave or at the frequency $$\frac{F}{2}$$

The successive dividers 43, 44, 45 and 46 are all constructed similarly to divider 38 and operate in similar manner, so that they are shown by boxes merely. The outputs from each of these dividers are taken off by a pair of leads, 50 and 51 in the case of divider 38, from the two plates by a potentiometer type of connection including resistances connected between the +250 volt bus 52, the −150 volt bus 40 and the plates of the divider tubes, such that when either tube is transmitting current, one of the two output leads 50 or 51 has impressed on it a voltage of −40 and the other a voltage of −67 volts. This arrangement is followed in each of the divider stages.

The lowest frequency pulses $$\left(\frac{F}{32}\right)$$

are obtained from the divider 46 in leads 55, are amplified at 56 and put through a limiter 57 to give large amplitude flat topped waves for application to the control grids of the phase reversing control tubes 60 and 61 (Fig. 5). Lead 58 has either 0 or −35 volts on it and lead 59 has either −35 or 0 volts on it, each voltage being present on each lead half the time and being opposite on the two leads. Referring to Fig. 1, the reversal of polarity on these leads occurs at times $T_1$, $T_7$ and $T_8$ so that the length of each polarity of pulse is $T_1$ to $T_7$ or $T_7$ to $T_8$. (This particular voltage wave is not illustrated on Fig. 1 but it would be twice as long in wave-length as wave 4.) The turn-over in phase previously spoken of as occurring at the peaks of the wave 6 in each of the component waves 1, 2, 3, 4 and 7 is controlled from tubes 60 and 61 and the turn-over times are determined by the potential changes on leads 58 and 59.

Figure 1:
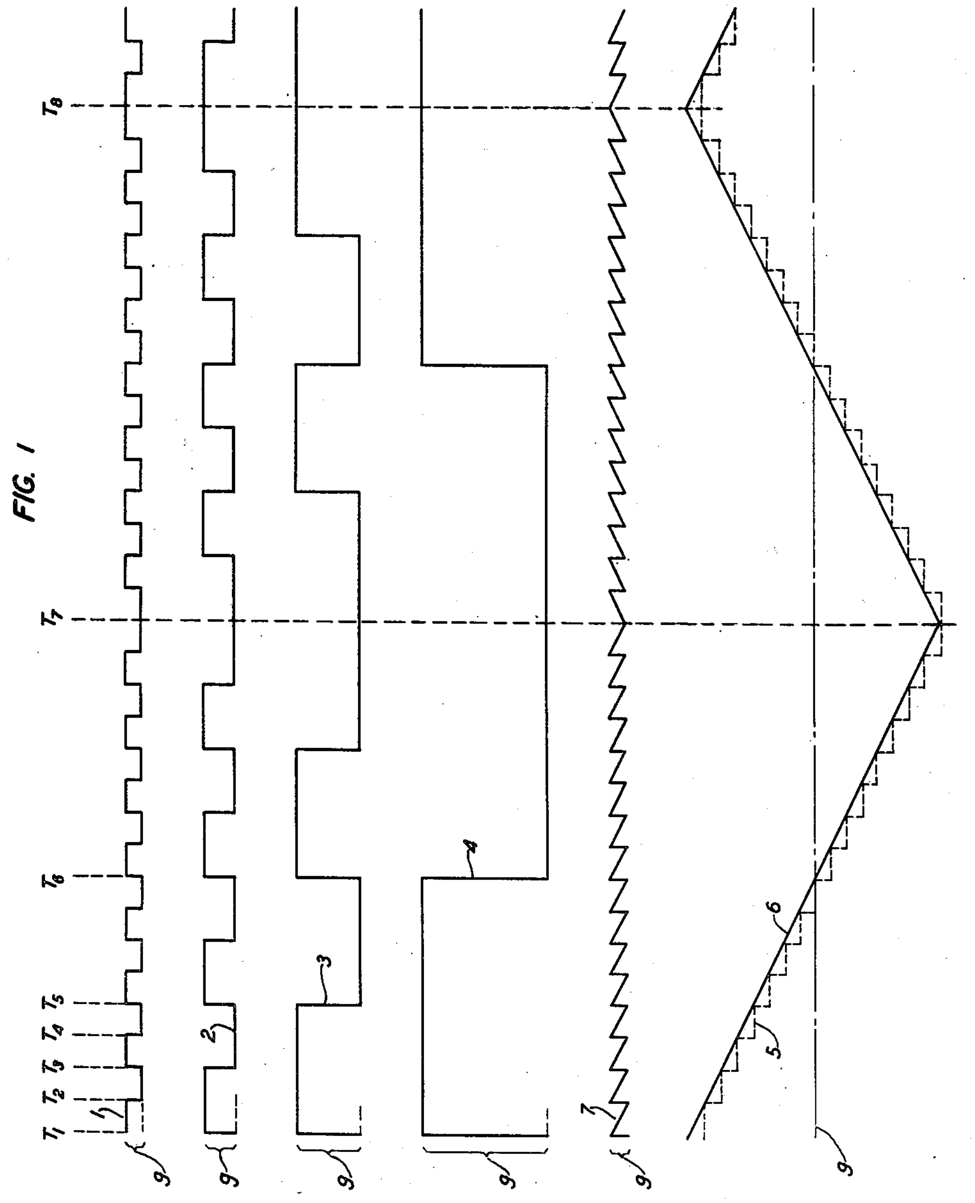
Fig. 1 shows the manner in which the component waves are combined to give the final wave.
Figure 2:
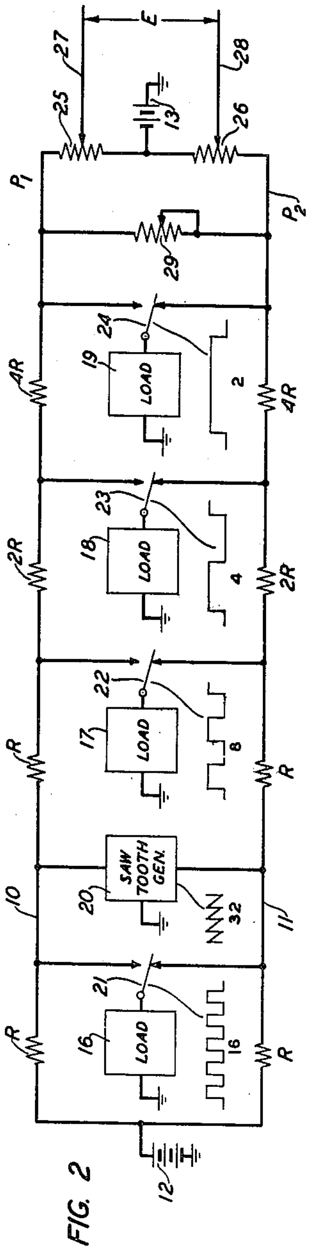
Fig. 2 is a simplified schematic circuit diagram of the overall system.

First it will be considered how the wave 1 of Fig. 1 is produced and applied to the upper and lower paths 10 and 11 referred to in Fig. 2 and shown in detail at the top of Fig. 4. This is done by biasing the tubes 85 and 86 so that current is drawn through one or the other of the left-most resistors in the upper branch 10 and lower branch 11, as will now be described.

When the control grid of tube 60 or 61 is −35 volts, the tube is entirely cut off and its plate potential is quite positive as determined by the plate circuit resistors acting as potential dividers. When the control grid is at 0 volts, the anode has a voltage of roughly 0. Since each tube 60, 61 is at all times in one or the other of these extreme conditions, it is seen that variations in the tube characteristics such as might result from changing tubes do not affect the operation of the system. If we take the case where conductor 59 is negative (−35 volts) and conductor 58 is at 0 voltage, the plate of tube 60 is at high positive voltage and the plate of tube 61 is at zero. These potentials are applied to the grids of tube 62 by means of the resistors connected between the plates of tubes 60 and 61 and the −150 volt bus 40. It will be clear from what has been said that this situation reverses at times $T_1$, $T_7$, $T_8$, etc. Tube 62 is connected as a cathode-follower tube with a high cathode resistance for stabilizing its characteristics by feedback action. Its cathode voltages under the two extreme conditions shift from a voltage of +3 to −40 and vice versa in unison with the changes in conduction of tubes 60 and 61.

Leads 62*a* and 62*b* from the cathodes of tube 62 extend to the cathodes of the switching tubes in the lower half of Fig. 4 of which the first pair comprises double triodes 82, 83 and 81, 84. The cathodes of 81 and 83 are connected to lead 62*a*, while the cathodes of 82 and 84 are connected to lead 62*b*. Thus, these cathodes have their potentials shifted in pairs between the values +3 and −40 volts in alternation, at the frequency $$\frac{F}{32}$$

The grid voltages of these same pairs of triodes are also shifted between extreme values of −40 and −67 volts under control of leads 50 and 51 as already described, at the frequency $$\frac{F}{2}$$

but it will be noted that the pairing of the grids is different from the pairing of the cathodes since the grids of 82 and 81 are paired and the grids of 83 and 84 are paired. These triodes are cut off individually when the grid has any of these extreme voltage conditions other than −40 volts at the same time that its cathode is at −40 volts since it will be seen that in all of the other conditions the grid is at least as far negative as −27 volts with respect to its cathode and this is sufficiently negative to cut off transmission through the tube.

The plates of these pairs of triodes are paired in a still different manner, plates of 82 and 83 being paired and plates of 81 and 84 being paired. The effect of this is that during the relatively long periods in which lead 62*a* (for example) is at −40 volts, the relatively rapid pulses of −40 volts occurring on lead 51 (for example) can only result in causing the one triode 81 to conduct, making the grid of load tube 86 negative and cutting off that tube. At these same instants of time the −67 volt pulses on lead 50 prevent triode 83 from conducting so that the grid of load tube 85 is free to assume a potential as determined by the associated resistors and regulating tube and draw a regulated current through the resistor R at its left in branch path 11. During those relatively long times in which lead 62*b* is at −40 volts, the relatively rapid −40 volt pulses occurring on lead 51 can, on the contrary, only result in causing the triode 82 to conduct while the alternate −40 volt pulses on lead 50 can only cause triode 84 to conduct. A reversal of polarity on the leads 62*a* and 62*b* therefore reverses the control as between the pulses in leads 50, 51 and the load tubes 85, 86, so that at time $T_7$, for example, two opposite pulses on lead 50 immediately following each other, one coming just before and the other just after time $T_7$, produce the same effect on the load tubes since the voltage conditions on leads 62*a* and 62*b* have reversed at time $T_7$.

In order to make the load that is connected to lines 10 and 11 in this manner draw a constant current, the tubes 92 and 93 are provided together with resistors 90 and 91 of which the resistance of 90 may be in the order of 75,000 ohms and two or three times larger than the resistance of 91. The load current flows in series through these two resistors and as the current tends to vary, the potential on the grid of tube 85 or 86, whichever is conducting, is caused to follow the variations but in an opposing phase relation by feedback action around the two stages 92, 85 or 93, 86. The voltages of sources 12 and 13 are assumed to be constant and in practice may be closely regulated. As other load circuits along the branches 10, 11 are switched in and out, the plate voltage of tubes 85 and 86 varies and the regulator tubes 92 and 93 are effective in compensating for the effect which such variations would otherwise have on the load current drawn by these load tubes.

The other load circuits are shown in detail at 17, 18 and 19 but no further description of these is deemed necessary since they are duplicates of load circuit 16 and operate in the same way except for the difference in frequency as determined by the frequency of the pulses which they receive on their control grids from the respective double triode circuits shown below them in the figure, whose grids are controlled from the different divider stages of Fig. 3.

The saw-tooth wave variations are produced in the branch paths 10 and 11 by connecting the plates of the tubes 64 and 65 in different manners to conductors 10 and 11 and varying the potential applied to these tubes under control of voltages derived from the saw-tooth wave generator and the $$\frac{F}{32}$$

divider circuit. Tubes 64 and 65 are connected to the paths 10 and 11 by leads 64*a* and 64*b*. The saw-tooth wave generator is shown as enclosed in a broken line rectangle in Fig. 5 at 80. This generator is of the type in which a condenser 71 is slowly charged in series with the plate circuit of a vacuum tube 72 and in which the condenser is rapidly discharged at regular intervals through a tube 79. The saw-tooth shaped voltage variation on condenser 71 is applied to the grid of tube 73 and the output is taken off from across the cathode resistor 181, 182 in lead 183 for application to the tubes 64 and 65 in a manner to be described later on.

Condenser 71 has its upper plate connected to the +250 volt bus 52, and its lower plate connected to the anode of tube 72 the cathode of which is connected through a resistor to the −150 volt bus 40. The timing of the discharge of condenser 71 is determined by the positive voltage pulses received over lead 34 from tube 33 of Fig. 3, occurring at the frequency F. These pulses are applied to the cathode of tube 78 and when so applied, they interrupt the normal current flow through that tube. The two tubes 78 and 79 form a flip-flop circuit of known type having a stable condition in which tube 78 is transmitting saturation current and tube 79 is cut off. In this condition of the circuit the condenser 71 is being charged in series with tube 72 as already noted. When a timing pulse is received over lead 34, tube 78 is suddenly cut off and tube 79 is changed to low impedance by the transfer of positive voltage to its grid. Tube 79 then quickly discharges condenser 71. Resistance 77 is made small so as to permit very rapid discharge of the condenser and give a nearly vertical front to the saw-tooth wave.

The limit of discharge of condenser 71 is set by diode 70 which has its cathode connected to derive an adjustable positive bias from resistor 87. This diode forms a potential divider with resistor 185 by which the grid of tube 79 is given some limiting value such as +110 volts. When the cathode of tube 79 rises in potential with the discharging of condenser 71, the grid voltage of tube 79 rises with it until the diode 70 limits the grid to a potential of +110 volts at which time the potential of the grid of tube 79 relative to its cathode decreases and then becomes negative until it starts to reduce the current flow through tube 79 to the point where the circuit including tubes 78, 79 flips to its normal, stable condition in response to the transfer of positive voltage to the grid of tube 78. Tube 79 then is cut off and the charging of condenser 71 begins again, starting the cycle to repeat.

With the switch 190 in its lower position, the saw-tooth voltage developed across resistors 181, 182 is applied, as stated, over lead 183 and through the switch 190 to lead 83*a* to the outer pair of grids of tubes 64 and 65. Resistance 191 and condenser 192 have such a large time constant that the inner grids of these tubes are unable to follow the saw-tooth voltage so that only the average of the saw-tooth voltage is applied to these grids.

Each tube 64, 65 has its cathodes connected to the negative bus 40 in series with the respective half of the reversing tube 66, 67 which is a constant current device (due to feed-back action in its high cathode resistor) transmitting current through one side or the other. Tubes 66 and 67 derive their grid bias from resistors 96, 97 in the respective plate circuits of the switching pentodes 60, 61. It will be recalled that only one of these pentodes is transmitting at a time, the opposite pentode being cut off. The bias voltages thus applied to the grids of reversing tubes 66, 67 are such as to cut off one of the two triodes and allow the other to transmit full current, the two triodes alternating their conditions with the alternating conditions of the switching pentodes 60, 61.

Considering the period in which triode 66, for example, is conducting, a constant current is caused to flow through this triode and to divide between the two space paths of tubes 65. Saw-tooth variations on the right-hand grid cause the right-hand half of tube 65 to produce output current of saw-tooth form in lead 64*b* and since the total current through both halves of this tube is held constant, saw-tooth current of complementary value is caused to flow through the left-hand half of tube 65 into lead 64*a*. Complementary saw-tooth currents are thus drawn through the left-most resistors R, R of circuit paths 10 and 11 causing balanced saw-tooth voltage variations to be superposed on the square waves at the output ends of paths 10 and 11.

When the switching pentodes 60 and 61 reverse their conditions (at times $T_1$, $T_7$, $T_8$, etc., Fig. 1), triodes 66 and 67 also reverse their conditions, tube 64 now becomes the tube through which the saw-tooth waves are applied to leads 64*a* and 64*b*, and it will be seen that the saw-tooth wave is now reversed or turned over in phase since the plates of the tube 64 are reversely connected to leads 64*a* and 64*b* with respect to the plates of tube 65. The slope of the saw-tooth wave is in this way always kept in the right direction to fill in the steps of the stepped wave 5 of Fig. 1 to give the sloping side 6 regardless of whether the latter is ascending or descending.

In order to assist in maintaining the current through triodes 66, 67 constant despite the saw-tooth variations occurring in the current through tubes 64 and 65, a small amount of correcting saw-tooth voltage is brought via lead 68 from lead 83*a* to the cathodes of tubes 66, 67 at the cathode end of resistor 69 which forms part of the series resistance between these cathodes and the negative bus 40.

If switch 190 is thrown to its upper position, no saw-tooth waves are impressed on the tubes 64, 65 but these tubes are merely hung on the paths 10 and 11 as constant loads. This allows a stepped output 5 (Fig. 1) to be produced. Switch 190 is convenient for tracing errors or trouble and for calibrating and adjusting purposes.

One feature of the invention is that as the frequency of the input oscillator 30 of Fig. 3 is varied to change the length of the final pyramidal wave, all parts of the circuit including the saw-tooth wave generator automatically accommodate their operation to the new frequency to produce the pyramidal wave of required shape. The lengths of the square waves of Fig. 1 all change in the same proportion so that they add up properly. A more difficult problem is to cause the saw-tooth wave always to assume the required shape exactly to fill in the steps. As the frequency is increased to build a shorter pyramidal wave, it is seen that the slope of the saw-tooth or triangular wave must be increased and vice versa. This is done in the present disclosure by automatically controlling the charging rate of the condenser 71 to have a faster charging rate for a higher frequency adjustment.

The charging rate of condenser 71 is controlled by varying the internal impedance of tube 72. If the voltage developed across condenser 71 at the time when a discharging pulse comes in from the timing circuit over lead 34 is lower than the maximum saw-tooth wave voltage, this is an indication that the charging rate is too slow and the circuits provided are such as to lower the impedance of the tube 72 to permit of a higher rate of charging. If on the contrary too high a voltage develops across condenser 71 before the condenser is discharged by the timing pulse, this indicates that the charging rate is too high and the internal impedance of valve 72 is increased to reduce the charging rate.

Since the voltage of the upper plate of condenser 71 is at the fixed value of +250 volts, the minimum positive voltage value to which the lower plate of the condenser falls can be used to determine whether the charging rate is too high or too low. As the condenser 71 is being charged, the grid potential and also the cathode potential of tube 73 are carried down to lower and lower positive values until the condenser is discharged. There will, therefore, be some critical minimum voltage, for example, +130 volts, to which the cathode of tube 73 falls when the charging rate is exactly right. Under these conditions the cathode of the diode 186 connected to the potential divider resistors 181 and 182 is carried downward in voltage to a slightly negative value such as to permit a certain amount of current to flow through the diode 186 and charge the condensers 94 and 95 negatively. (The resistances shown associated with these condensers are for the purpose of giving the circuit a relatively large time constant.) Under correct conditions of operation, condensers 94 and 95 will apply a certain residual negative voltage to the grid of tube 74. This results in applying a voltage to the grid of tube 75 such as to determine a particular voltage at point 76 in the output circuit. Point 76 is connected directly to the grid of the tube 72 and applies a bias thereto.

If now the charging rate for condenser 71 is too great, the cathode of tube 73 and therefore the cathode of diode 186 will be carried too far in the negative direction, increasing the negative charge on condensers 94 and 95, making the grid of tube 75 more positive and the potential at point 76 more negative. This increases the negative bias on the grid of tube 72 and increases the impedance of the tube thereby lowering the charging rate of condenser 71. If the charging rate is too small, the amount of current transmitted through the diode 186 is reduced and this in turn finally makes the potential of point 76 and of the grid of tube 72 more positive, thus increasing the charging rate of condenser 71.

The final output angular wave may be taken off at output terminals 99. The resistors 25 and 26 are shown in Fig. 4 as of balanced or symmetrical type and a low-pass filter 98 is shown in the output connection for suppressing ripple or other high frequency components.

What is claimed is:

1. A saw-tooth wave generator comprising a source of direct voltage, a space discharge device and a condenser in a series charging circuit, a double stability circuit comprising two electron tubes having electrodes and connections such that the circuit has one condition of stability to which it returns at a predetermined time interval after it is tripped therefrom, a discharging circuit for said condenser including a current conducting path through one of the tubes of said circuit, pulsing means for triggering said double stability circuit to periodically close said current conducting path, thereby to discharge said condenser under control of the pulses of said pulsing means, and means to insure that the condenser is always charged to the same extent between discharging times comprising a grid in said discharge device and circuit means in energy transfer relation between said condenser and said grid for developing and applying to said grid a bias voltage dependent upon the maximum voltage across said condenser, such bias voltage varying in magnitude and sign and in turn varying the charging rate of said condenser in inverse relation to the frequency of said timing pulses.

2. A saw-tooth wave generator comprising a double stability circuit comprising a pair of electron tubes having electrodes and connections such that the circuit has one condition of stability to which it returns at a predetermined time interval after it is tripped therefrom, a condenser and a charging circuit therefor including a grid-controlled discharge tube in series therewith and with a source of charging voltage, a source of timing pulses adjustable as to frequency, a discharging circuit around said condenser, said discharging circuit comprising a current conducting path through one of the tubes of said double stability circuit, and means to apply said timing pulses to trigger said double stability circuit at stated intervals to close said path thereby discharging said condenser at the rate of occurrence of said pulses, and means to control the charging rate of said condenser to maintain the maximum voltage reached between discharge times comprising a circuit connected to said condenser and responsive to the peak voltage developed across for developing a bias voltage and for applying said bias voltage to the grid of said tube to control thereby said charging rate.

3. A saw-tooth wave generator comprising a condenser, a charging circuit for said condenser including an electron discharge device and a source of charging voltage, said device comprising a cathode, anode and control grid, said anode being connected with one terminal of said condenser, the other condenser terminal being connected with one terminal of said charging source and said cathode being connected with the other terminal of said charging source, means bridged across the terminals of said condenser for discharging the latter, said means comprising a current conducting path through one tube of a double stability circuit having two electron tubes which include electrodes and connections such that the circuit has one condition of stability to which it returns at a predetermined time interval after it is tripped therefrom, means for tripping said double stability circuit at any one of several different frequencies of discharge, and means for adjusting the charging rate of said condenser so as to maintain substantially constant the maximum voltage reached between discharge times across said condenser regardless of the frequency of discharge, said means comprising a variable-voltage generating circuit responsive to the peak charge on said condenser for applying to the control grid of said discharge device a bias potential respective to the instant frequency of discharge of the condenser.

4. A saw-tooth wave generator comprising a condenser, a charging circuit for said condenser including an electron discharge device and a source of charging voltage, said device comprising a cathode, anode and control grid, said anode being connected with one terminal of said condenser, the other condenser terminal being connected with one terminal of said charging source and said cathode being connected with the other terminal of said charging source, means bridged across the terminals of said condenser for discharging the latter, said means comprising a conduction path through one electron tube of a trigger circuit having two electron tubes so connected that the said circuit has one condition of stability to which it returns at a predetermined time interval after it is tripped therefrom, means for tripping said double stability circuit periodically closing said discharge path for said condenser at any one of several different frequencies of discharge, and means for adjusting the charging rate of said condenser so as to maintain substantially constant the maximum voltage reached between discharge times across said condenser regardless of the frequency of discharge, said means comprising a variable-voltage generating circuit directly connected between said condenser and the control grid of said discharge device for applying to said grid a bias potential adjusted in magnitude respective the instant frequency of discharge of said condenser and in direction of change of magnitude opposite to the direction in which the frequency of discharge shall have been changed.

5. A saw-tooth wave generator comprising a condenser, a charging circuit for said condenser including an electron discharge device and a source of charging voltage, said device comprising a cathode, anode and control grid, said anode being connected with one terminal of said condenser, the other condenser terminal being connected with one terminal of said charging source and said cathode being connected with the other terminal of said charging source, means bridged across the terminals of said condenser for discharging the latter, said means comprising a conduction path through one electron tube of a trigger circuit having two electron tubes so connected that the said circuit has one condition of stability to which it returns at a predetermined time interval after it is tripped therefrom, pulsing means for operating said trigger circuit to periodically close said discharge path for said condenser at any one of several different frequencies of discharge, a second electron discharge device comprising a cathode, anode and a control electrode, the control electrode of said second device being connected with said anode terminal of said first mentioned device, an anode-cathode circuit for said second device including cathode-resistor means across which the voltage representative of the saw-tooth wave is developed as said second control electrode follows the potential of said one condenser terminal during the charge-discharge cycle of said condenser, and means responsive to a portion of the voltage developed across said cathode-resistor means for applying a bias voltage to said first control electrode respective each different frequency of discharge of said condenser discharging means for adjusting the condenser-charging rate upon a change in the frequency of discharge of the condenser, in a direction to maintain substantially constant the maximum voltage reached between discharge times across said condenser.

6. A saw-tooth wave generator comprising a source of direct voltage, a variable impedance device and a condenser in a series charging circuit, a trigger circuit comprising a pair of electron tubes so connected that the said circuit has one condition of stability to which it returns at a predetermined time interval after it is tripped therefrom, a discharging circuit for said condenser including a conducting path through one of the tubes of said circuit, and pulsing means for operating said trigger circuit to discharge the condenser at any one of several frequencies, means comprising a circuit coupled with the condenser for developing a varying voltage representative of the saw-tooth wave, and including means responsive to a portion of the varying voltage for adjusting the impedance of said device such that the charging rate of the condenser provides the desired voltage across the condenser at the time of discharge thereof for a given frequency of discharge, and for varying the impedance of said device from said adjusted value to a value respective to the condenser-charging rate required to maintain said desired discharge voltage at another of the several frequencies of discharge determined by said discharging circuit.

7. A saw-tooth wave generator comprising a condenser and a series charging circuit therefor including a variable impedance for adjustment of the charging rate of said condenser and a source of charging voltage, a trigger circuit comprising a pair of electron tubes so connected that the said circuit has one condition of stability to which it returns at a predetermined time interval after it is tripped therefrom, a discharging circuit for said condenser including a conducting path through one of the tubes of said trigger circuit and means including a circuit for tripping said trigger circuit to periodically close said conducting path thereby discharging the condenser at any one of several different frequencies, means connected in circuit relation with said condenser for developing during the charging and discharging of said condenser a voltage representative of the saw-tooth wave, and means for maintaining substantially constant the maximum voltage reached between discharge times across said condenser, upon change from one to another of said several frequencies of discharge, said last mentioned means including a circuit responsive to said saw-tooth wave voltage for adjusting the impedance of said variable impedance, and hence the charging rate of said condenser, from the value respective the one frequency of discharge to the required value respective the frequency of discharge to which change is made.

8. In a signaling apparatus, a trigger circuit comprising two tubes each having an anode, a cathode and a control electrode, the anode of one said tube directly interconnected with the control electrode of the other said tube and vice versa such that the circuit has one condition of stability to which it returns at a predetermined time interval after it is tripped therefrom, a capacitor, a discharging path for the capacitor including the impedance between the electrodes of one of said tubes, a charging path for said capacitor including a source of continuous unidirectional current, connections to said trigger circuit for tripping the same from said one condition of stability at a recurring rate and an output circuit coupled to said capacitor.

9. In a signaling apparatus, a trigger circuit comprising two tubes each having an anode, a cathode and a control electrode, the anode of one said tube directly interconnected with the control electrode of the other said tube and vice versa such that the circuit has one condition of stability to which it returns at a predetermined time interval after it is tripped therefrom, a capacitor, a discharging path for the capacitor including the impedance between the electrodes of one of said tubes, a charging path for said capacitor including a source of continuous unidirection current the magnitude of which varies with signals, a source of alternating voltage of constant frequency connected to said trigger circuit for tripping the same from said one condition of stability at a constant rate and an output circuit coupled to said capacitor.

10. In a signaling apparatus, a trigger circuit comprising two tubes each having an anode, a cathode and a control electrode, the anode of one said tube directly interconnected with the control electrode of the other said tube and vice versa such that it has one condition of stability to which it returns at a predetermined time interval after it is tripped therefrom, a condenser, a discharging path therefor including the impedance between electrodes of one of said tubes, a third tube having an anode, a cathode and a grid operated so that the anode current flow in the tube is linearly related to its grid potential irrespective of anode potential variations, a charging path for said condenser including the impedance between the anode and cathode of the third tube, connections to said trigger circuit for tripping the same at a rate such that the time intervals between tripping operation are greater than said first time intervals and an output circuit coupled to said condenser.

11. In a signaling apparatus, a trigger circuit comprising two tubes having electrodes and connections such that it has one condition of stability to which it returns at a predetermined time interval after it is tripped therefrom, a condenser, a discharging path therefor including the impedance between electrodes of one of said tubes, a third tube having an anode, a cathode and a grid operated so that the anode current flow in the tube is linearly related to its grid potential irrespective of anode potential variations, a charging path for said condenser including the impedance between the anode and cathode of the third tube, connections from the output across said condenser to the electrode of said third tube to modulate the potential therein in accordance with signals, connections to said trigger circuit for tripping the same at a rate such that the time intervals between tripping operation are greater than said first time intervals and an output circuit coupled to said condenser.

12. In a signaling apparatus, a trigger circuit comprising two tubes each having an anode, a cathode and a control electrode, the anode of one said tube directly interconnected with the control electrode of the other said tube and vice versa such that it has one condition of stability to which it returns at a predetermined time interval after it is tripped therefrom, a condenser and a discharging path therefor including one of said tubes, a third tube having an anode, a cathode and a grid operated so that the current flow in the tube is linearly related to its grid potential irrespective of anode potential variations, a charging path for said condenser including the impedance between the anode and cathode of the third tube, a network for modifying the shape of recurring potentials of carrier frequency connected to said trigger circuit for firing the same at said recurring rate and an output circuit connected to said condenser.

LESTER Y. LACY.

REFERENCES CITED

The following references are of record in the file of this patent:

UNITED STATES PATENTS

| Number | Name | Date |
|---|---|---|
| 2,157,434 | Potter | May 9, 1939 |
| 2,241,619 | Sherman | May 13, 1941 |
| 2,266,516 | Russell | Dec. 16, 1941 |
| 2,448,069 | Ames, Jr., et al. | Aug. 31, 1948 |
| 2,448,070 | Sunstein | Aug. 31, 1948 |